United States Patent

Murphy

[15] 3,643,982
[45] Feb. 22, 1972

[54] DUST SEALING MECHANISMS FOR HOPPERS OR THE LIKE

[72] Inventor: Arthur Douglas Murphy, Bramhall, England

[73] Assignee: Simon-Carves Limited, Cheshire, England

[22] Filed: Aug. 7, 1970

[21] Appl. No.: 62,149

Related U.S. Application Data

[63] Continuation of Ser. No. 804,966, Mar. 6, 1969, abandoned.

[30] Foreign Application Priority Data

Mar. 14, 1968 Great Britain ..................... 12,402/68

[52] U.S. Cl. .................................. 285/9, 141/312, 141/383, 285/302, 285/DIG. 13
[51] Int. Cl. ................................................. F16l 25/00
[58] Field of Search ............... 285/9, 18, 302, 314, 358, 394, 285/163, DIG. 21, DIG. 13, 31, 32; 287/58 CT; 141/312, 383

[56] References Cited

UNITED STATES PATENTS

| | | | |
|---|---|---|---|
| 2,459,981 | 1/1949 | Worren | 285/111 |
| 2,664,918 | 1/1954 | Homer | 285/DIG. 13 |
| 3,053,553 | 9/1962 | Browning | 285/DIG. 13 |
| 3,233,549 | 2/1966 | Howe | 285/9 X |
| 3,290,063 | 12/1966 | Haeber | 285/18 |

FOREIGN PATENTS OR APPLICATIONS 882,022   7/1953   Germany ..................... 285/9

*Primary Examiner*—Dave W. Arola
*Attorney*—Norris & Bateman

[57] ABSTRACT

A dust sealing mechanism for use in association with a receptacle for dust containing material and comprising a pair of relatively movable telescoped sleeves, one of said sleeves being adapted to be moved into sealing engagement with an outlet from which the material is fed to the receptacle, and the other of said sleeves being adapted to cooperate with an inlet in the receptacle, and means interconnecting the two sleeves for effecting opposite axial movement of the sleeves into their operative position whereby material can be fed through the sleeves into the receptacle comprising a rotatable ring having camming engagement with the respective sleeves.

12 Claims, 6 Drawing Figures

PATENTED FEB 22 1972

INVENTOR
ARTHUR DOUGLAS MURPHY

BY Norris & Bateman

INVENTOR
ARTHUR DOUGLAS MURPHY
BY Davies & Bateman

DUST SEALING MECHANISMS FOR HOPPERS OR THE LIKE

This application is a continuation of application, Ser. No. 804,966, filed Mar. 6, 1969, now abandoned.

This invention relates to a dust-sealing mechanism for use in conjunction with the inlet opening of a hopper when the hopper is being filled from, for example, a bunker with a pulverulent material such as coal and in which emission of dust takes place during the filling operation.

An object of the present invention is to provide an arrangement whereby such dust emission is obviated or mitigated.

According to the present invention there is provided a dust-sealing mechanism for use in association with a receptacle for dust containing material comprising a pair of relatively movable sleeves, one of said sleeves being adapted to be moved into sealing engagement with an outlet from which the material is fed to the receptacle, and the other of said sleeves being adapted to cooperate with an inlet in the receptacle, and means interconnecting the two sleeves for effecting movement of the sleeves into their operative position, whereby material can be fed through the sleeves into the receptacle.

Preferably, the means for effecting movement of the sleeves comprises a cam or cams on said sleeves and a rotary ring which carries a plurality of rollers in engagement with said cams and said ring being rotatable in order to effect relative movement of the two sleeves.

An embodiment of the invention will now be described by way of example with reference to the accompanying drawings, in which.

Figure 2:
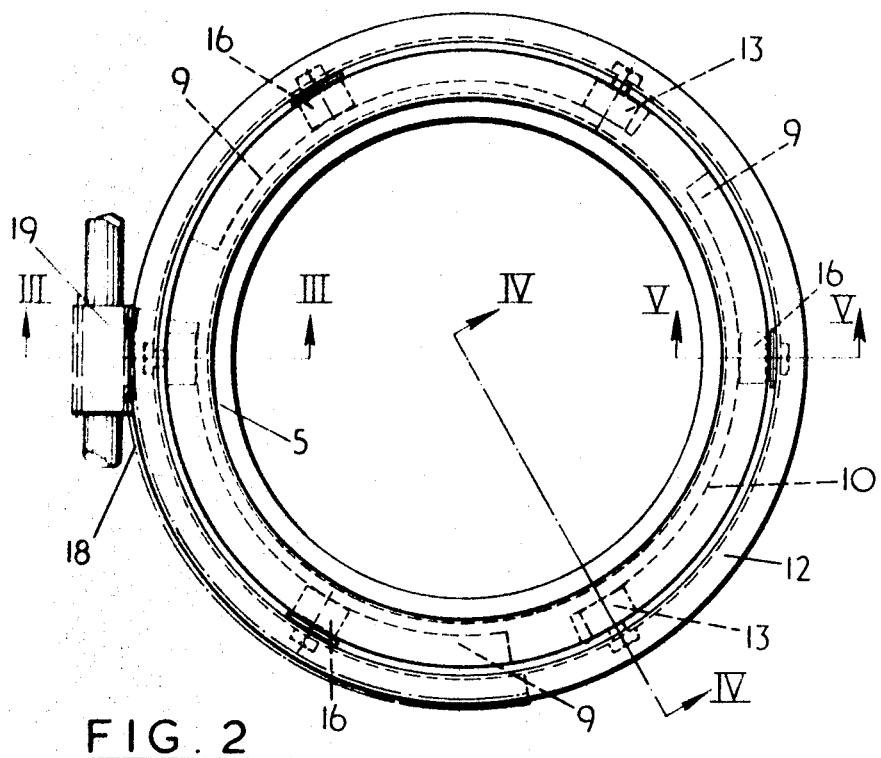
FIG. 2 is a plan view of the dust-sealing mechanism.
Figure 1:
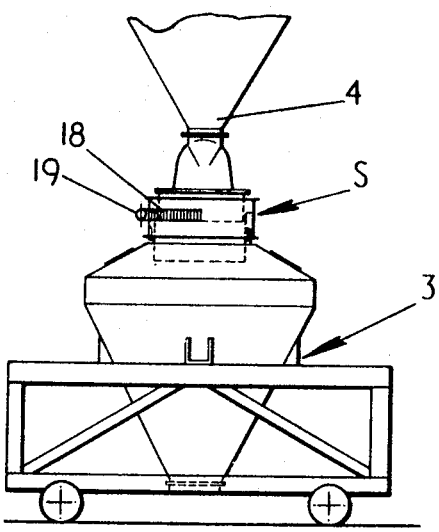
FIG. 1 is a diagrammatic view of a hopper and bunker with a dust-sealing mechanism in accordance with the present invention disposed therebetween.

Referring now to the drawings, a dust-sealing mechanism generally indicated at S for effecting a dust seal between a wheeled travelling hopper 3 and a bunker 4 from which the hopper 3 is filled with pulverulent material, such as coal, comprises an inner cylindrical sleeve 5 having a sealing face 6 and an outer cylindrical sleeve 8 within which the inner sleeve 5 can slide vertically. The inner sleeve 5 is provided with a horizontal flange 7 at its upper end and on the underside of the flange 7 there are fixed three equispaced cams 9. The outer sleeve 8 is also provided with a horizontal flange 10 to the underside of which are secured three equispaced cams 11.

Surrounding both the inner and outer sleeves 5 and 8 is a rotary ring 12 which carries upper and lower rollers 13 and 14 which run on cams 9 and 11 respectively. The ring 12 is supported on a flange track 15 through three equispaced wheels 16 secured to the ring 12, the track 15 being integral with the outer periphery of the mouth proper 17 of the hopper 3. The ring 12 is provided with a segment 18 of a worm wheel and this segment meshes with a worm 19 which can be driven either by a geared motor unit (not shown) or by hand in order to effect rotation of the ring 12.

Secured to the inner periphery of the hopper mouth proper 17 is a peg 20 which engages in a vertically slotted hole or groove 21 in the outer sleeve 8. Similarly secured to the inner periphery of the outer sleeve 8 and adjacent the horizontal flange 10 is a peg 22 which is engaged in a vertically slotted hole or groove 23 in the inner sleeve 5. The pegs 20 and 22 prevent the inner sleeve 5 and the outer sleeve 8 rotating with the revolving ring 12.

The outer sleeve 8 is also provided at its lower end with an adjustable extension sleeve 24 provided with four vertically slotted holes 25 equispaced therearound. Nuts and bolts 30 are provided to secure the extension sleeve 24 in its adjusted position relative to the outer sleeve 8. Vertical adjustment of the extension sleeve 24 allows the quantity of surcharge held within the sleeves 5 and 8 to be predetermined thus predetermining the capacity to be held in the hopper. A flexible circumferential dust seal 26 is secured to the underside of a coned upper portion 27 of the hopper 3 in order to provide a complete dust seal between the hopper mouth proper and the outer sleeve 8. A similar circumferential dust seal 28 is secured to an outer lower frustum portion 29 of the inner sleeve 5 so as to provide a dust seal between the inner and outer sleeve 5 and 8. The dust seal 28 rides freely up and down the outer sleeve 8 when vertical relative movement of the inner and outer sleeves is taking place.

Figure 4:
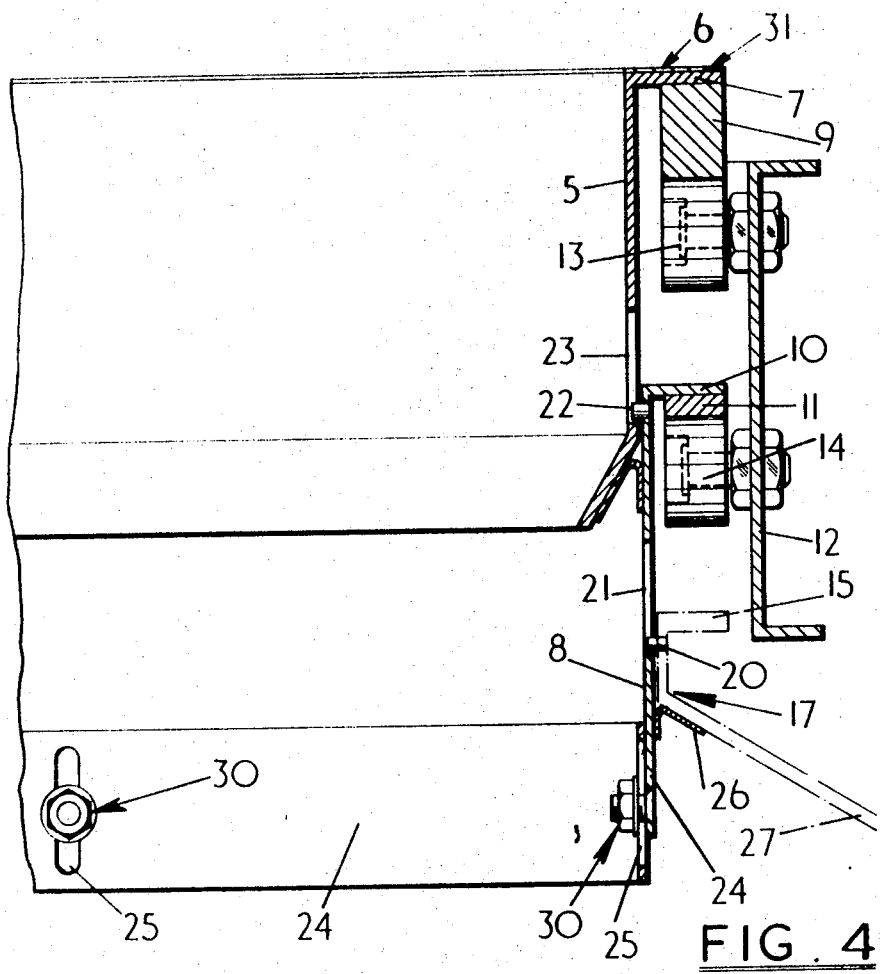
Figure 6:
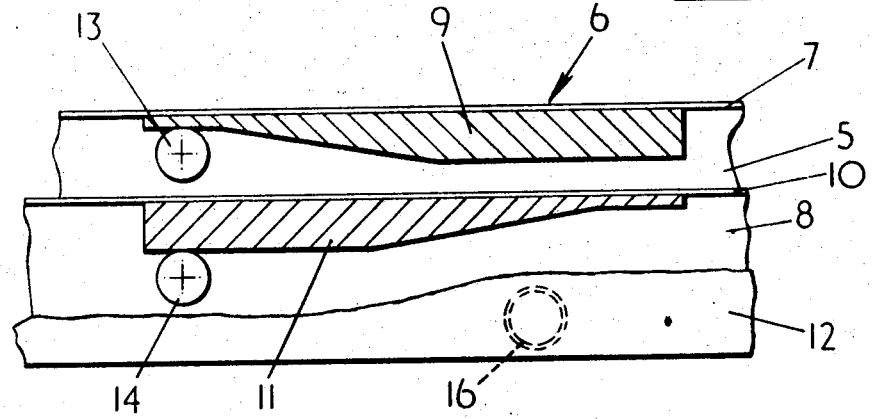
FIG. 6 is a fragmentary sectional diagrammatic detail view of the sleeves and cams, and ring and rollers.

In operation of the dust-sealing mechanism, the extension sleeve 24 is adjusted to the desired height to give the required surcharge and the mechanism is located with the wheels 16 on the track 15 adjacent the mouth of the hopper 3. The hopper 3 is located under the outlet of the bunker 4 from which the hopper is to be filled and the rotatable ring 12 is rotated relative to the inner and outer sleeves 5 and 8 to cause the rollers 13 and 14 to cooperate with the cams 9 and 11 on the sleeves so as to move the inner sleeve 5 upwardly (see FIG. 4) until its sealing face 6 engages a cooperating face 31 on the underside of the bunker outlet valve while the outer ring 8 moves downwardly to project into the hopper inlet. The disposition of the cams 9 and 11 is such that the inner sleeve 5 almost reaches its upper seal position before the outer sleeve 8 begins to lower into the hopper.

Figure 3:
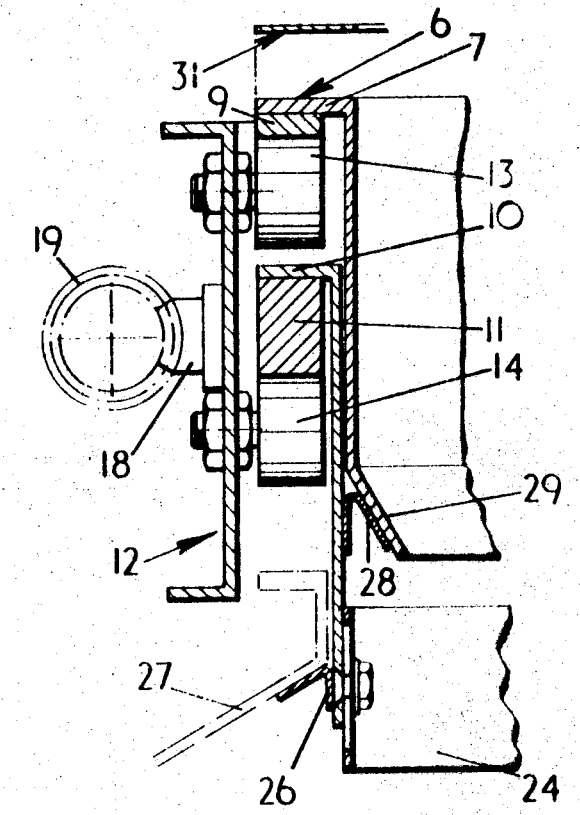
FIGS. 3, 4 and 5 are respectively sectional views on the lines III—III, IV—IV and V—V of FIG. 2.
Figure 5:
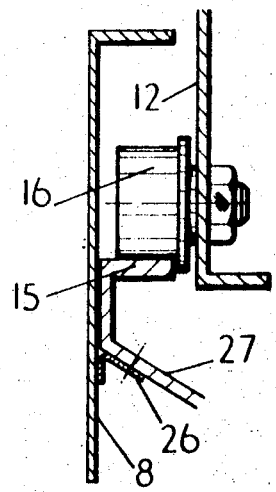

When the valve on the bunker 4 is actuated to cut off flow of the material into the hopper then the direction of rotation of the ring 12 is reversed. The outer sleeve 8 is raised before the inner sleeve 5 lowers thereby allowing the surcharge within the sleeve 5 and 8 to discharge into the hopper while the inner sleeve 5 is still sealed against the mouth of the bunker outlet. Finally the inner sleeve 5 is lowered to its out of service position (see FIG. 3).

The above-described dust-sealing mechanism provides an arrangement which is efficient, simple to operate and relatively inexpensive.

I claim:

1. A material transfer mechanism for use in association with a receptacle for dust containing material and comprising upper and lower sleeves, means interconnecting the two sleeves for effecting movement of the sleeves to an operative position by upward movement of the upper sleeve into sealing engagement with an outlet from which the material is to be fed to the receptacle and downward movement of the lower sleeve into the receptacle whereby material can be fed through the sleeves into the receptacle, and for effecting movement of the sleeve in reverse direction from their operative position in such a manner that the lower sleeve is moved upwardly before the upper sleeve is moved downwardly whereby at least some of the material located in the sleeves after charging the receptacle flows into the receptacle before the upper sleeve moves downwardly, thereby preventing spillage.

2. A material transfer mechanism as claimed in claim 1, wherein said means for effecting said movement of said sleeves comprises cam means on said sleeves, a rotary ring adjacent said sleeves, and a plurality of rollers on said ring in engagement with said cam means whereby rotation of said ring effects said movement of the two sleeves.

3. A mechanism as claimed in claim 2, in which said cam means comprises a plurality of equispaced cams mounted on each sleeve with the cams of one sleeve oppositely inclined to the cams on the other sleeve whereby the sleeves can be moved in opposite directions.

4. A mechanism as claimed in claim 1, in which the sleeves are constrained by pin-and-slot connections to move only vertically relative to one another.

5. A mechanism as claimed in claim 2, in which the ring is rotatably supported on a track means of several wheels.

6. A mechanism as claimed in claim 3, in which the ring is rotatably supported on a track by means of several wheels.

7. A mechanism as claimed in claim 5, in which the ring is rotatable by means of a worm meshing with a segment of a worm wheel secured to the ring periphery.

8. A mechanism as claimed in claim 6, in which the ring is rotatable by means of a worm meshing with a segment of a worm wheel secured to the ring periphery.

9. A mechanism as claimed in claim 7, in which one of the sleeves is provided with an adjustable extension sleeve.

10. A mechanism as claimed in claim 8, in which one of the sleeves is provided with an adjustable extension sleeve.

11. A mechanism as claimed in claim 9, comprising movable dust seal means between the pair of sleeves.

12. A mechanism as claimed in claim 10, comprising movable dust seal means between the pair of sleeves.

* * * * *